Patented Oct. 12, 1937

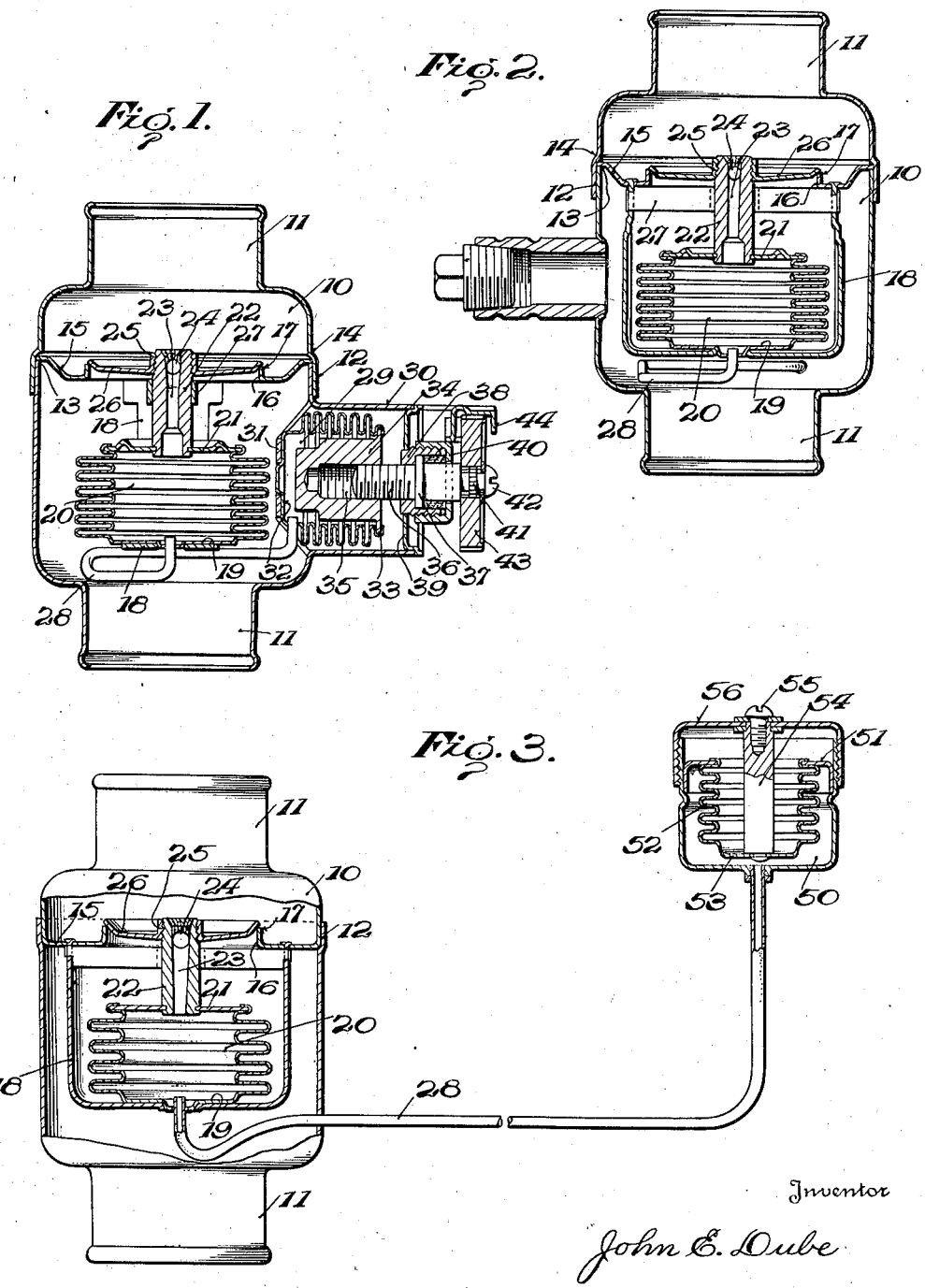

2,095,358

UNITED STATES PATENT OFFICE 2,095,358

ADJUSTABLE TEMPERATURE REGULATOR

John E. Dube, Knoxville, Tenn., assignor to The Fulton Sylphon Company, Knoxville, Tenn., a corporation of Delaware Application November 6, 1935, Serial No. 48,572

14 Claims. (Cl. 236—34)

This invention relates to a temperature regulator, and more particularly to a temperature regulator which has provision for predetermining the temperature at which the regulator responds to the temperature of a controlling medium.

The principal object of this invention is to provide a temperature regulator with novel means for adjusting the same.

Temperature regulators of the character employing a volatile fluid thermostat have commonly been rendered adjustable by providing a spring whose tension may be varied to add to or subtract from the resistance to expansion of the themostat when a difference in responding temperature is desired. Thermostatic elements or systems of the type which are completely filled with a liquid have also been provided with adjusting mechanism in the form of an expansion chamber communicating with the thermostatic element or system and which expansion chamber may be varied in volume to vary the temperature at which the expansion of the liquid in said element or system becomes effective to expand the thermostat. Expansion chambers of this latter character have not been available for use with thermostats employing a volatile liquid and its vapor because of the laws underlying the action of a vapor in the presence of its liquid, the vapor tension being determined solely by the temperature and a variation of volume of the vapor space being accompanied only by a condensation of the vapor or a volatilization of the liquid without change of pressure for a given temperature.

It is an object of the present invention to provide a temperature regulator employing a volatile fluid thermostat which can be adjusted by varying the volume of a chamber in the thermostatic element or system.

Another object of the present invention is to provide a device of the type last characterized wherein changes in the pressure of a permanent gas may be employed in conjunction with the operation of a volatile fluid thermostat to predetermine the temperature at which said thermostat responds to the temperature of the controlling medium, the term "permanent gas" being used herein in its usual sense of denoting a gas which retains its gaseous phase at all pressures and temperatures normally encountered in practice.

Another object of this invention is to provide a device of the type characterized wherein the provision for adjustment may be disposed at a distance relatively remote from the regulator.

Another object of this invention is to provide a temperature regulator of the character referred to which is relatively simple and compact in structure, so that it may be produced at a relatively low cost and readily installed in the cooling system of an automobile engine, and which at the same time has provision whereby the temperature at which said device responds to the cooling water temperature may be readily adjusted from the exterior of the instrument without need for removing the regulator from the cooling system.

Another object of this invention is to provide a device of the type characterized which may effect the automatic opening of the valve in the event of a failure of the thermostat.

Other objects will appear as the description of the invention proceeds.

Stated broadly, the present invention provides a temperature regulator which employs a volatile fluid thermostat that is also charged with a permanent gas so that by change in volume of the vapor space a change in gas pressure is obtained, thereby varying the temperature at which the thermostat responds to the temperature of the controlling medium.

The invention is capable of receiving a variety of mechanical expressions, two of which are illustrated on the accompanying drawing, but it is to be expressly understood that the drawing is for purposes of illustration only, and is not to be construed as a definition of the limits of the invention, reference being had to the appended claims for that purpose.

Referring in detail to the drawing, wherein the same reference characters are employed to designate corresponding parts in the several figures,—

Fig. 1 is an axial section of an embodiment of the present invention;

Fig. 2 is an axial section of the embodiment of Fig. 1 but taken at right angles to the section of Fig. 1; and Fig. 3 is an axial section of a further embodiment of the present invention.

In the form shown in Figs. 1 and 2, 10 designates a housing of any suitable size, construction and material, the same being shown as a generally tubular housing which, for example, has been illustrated as provided at its opposite extremities with nipples 11 by which said housing may be conveniently connected with the sections of a hose line such as commonly employed in the cooling system of an automobile engine. As shown, the housing is made in two sections having telescopic engagement at 12 so that the interior mechanism to be described may be readily assembled therein, after which the cover portion may be permanently attached in any suitable way to the body portion of said housing, or the parts may be left so that the cover and body may be readily disconnected for access thereto.

Supported in said housing 10, and preferably clamped in position between the extremity 13 of the body portion of said housing and a shoulder 14 on the cover portion thereof, is a disk-like member 15 provided with a central aperture 16 constituting a valve port, and here shown as having an upstanding flange 17 surrounding said port 16 and adapted to provide a valve seat for the valve member hereinafter described. If preferred, the member 15 may be made integral with the wall of the cover of the housing as shown in Fig. 3.

Suitably attached to said disk-like member 15 is a spider or strap adapted to form a support for the expansible and collapsible thermostatic element to be described. As shown, said support takes the form of a U-shaped strap 18 having its ends secured in any suitable way in apertures provided in the disk-like member 15, and attached to said strap in any suitable way is the stationary end wall 19 of an expansible and collapsible chamber 20 having its lateral wall formed by a deeply corrugated tubular metallic element or bellows, with one end integral with or suitably attached to said stationary end wall 19 and its opposite end suitably attached to a movable end wall 21. Attached to movable end wall 21 in any suitable way is a valve stem 22, here shown as provided with a passage 23 extending therethrough and providing a filling opening for the thermostat. After the thermostat is suitably charged, as hereinafter described, the passage 23 may be sealed, as by a ball and a plug of solder 24. Attached to said valve stem 22 in any suitable way, as by the threaded connection 25, is a disk-like valve member 26, here shown as having an inclined periphery so that it may make a line contact with the edge of the extremity of the flange 17. Valve stem 22 may be guided in its rectilinear movement in any suitable way; as shown a pair of strip-like elements 27 have their extremities secured in apertures in the strap 18 and their intermediate portions arcuately curved so as to embrace the valve stem 22, as shown in the section of Fig. 1, to provide a guide therefor.

Communicating with the interior of the expansible and collapsible chamber 20, through an aperture in the strap 18 and an aperture in the stationary end wall 19, is a tube 28 of any suitable material, size and length and which at its opposite extremity extends through the wall of an expansible and collapsible chamber 29 mounted at any suitable location and in any suitable way. In the embodiment of Figs. 1 and 2 said chamber 29 is shown as disposed in a lateral tubular extension 30 of the housing 10, and said chamber is retained in position by a strap 31 having its ends attached in any suitable way to the wall of the housing 10. As shown, said chamber 29 has a stationary end wall 32 attached in any suitable way to the strap 31, and its peripheral wall is in the form of a deeply corrugated tubular metallic element or bellows having one end suitably attached to or integral with said stationary end wall 32 and its opposite end suitably secured to a flange 33 on a movable end member 34. While end member 34 may be of disk-like construction, said member preferably takes the form of a block which extends into the chamber 29 and occupies a large part of the volume thereof so as to reduce the quantity of liquid required to fill said chamber 29. Block 34 is provided with a threaded recess 35, and cooperating therewith is a threaded stem 36 rotatably mounted in any suitable way, as by a flange 37 thereon suitably retained against a seat member 38 carried by the end wall 39 of the extension 30 by suitable packing interposed between said flange 37 and a cap member 40, here shown as threaded onto said seat member 38, whereby a fluid-tight gland is provided around said stem. Attached in any suitable way to the outer extremity of the threaded stem 36, as by a serrated extension 41 on said stem and a screw 42, is a rotatable hand grasp, shown as a disk 43 which may cooperate with a pointer 44 that may be conveniently formed on or suitably secured to the wall of the extension 30. Member 43 may have suitable indicia formed thereon, or provided by a plate secured to the face thereof, for cooperation with the pointer 44, so that the relative adjustment of the stem 36 may be readily determined by the relationship between said indicia and the pointer 44. Member 43 may if desired be knurled on its periphery to facilitate rotation thereof.

In conformity with the present invention the thermostat or thermostatic system, which is composed of the expansible and collapsible chamber 20, the tube 28 and the expansible and collapsible chamber 29, is charged with any suitable volatile liquid, the volume of said liquid being such that the chamber 29 and tube 28 are always filled with said liquid within the range of adjustment of the chamber 29 and a substantial body of said liquid exists in the chamber 20. Said thermostat is also charged with a predetermined volume of permanent gas which together with the vapor of said liquid occupies the remainder of the space in the chamber 20, the volume of gas used being such as to give a predetermined gas pressure, at a given temperature. The temperature of the chamber 29 should not be higher than that of the chamber 20, and it will be perceived that such is the condition existing in the regulator disclosed, because the chamber 20 is subjected to the temperature of the water flowing through the cooling system while the chamber 29 is cooled by the air flowing around the extension 30 of the housing, so that there is a tendency for the chamber 29 to be always at a lower temperature than the chamber 20 and at no time is there a tendency for the chamber 29 to have a higher temperature than the chamber 20.

For any given setting of the adjustment mechanism the thermostat will operate as a vapor thermostat. To adjust the temperature at which the thermostat responds to the temperature of the cooling medium, member 43 is rotated to move end member 34 inwardly or outwardly so as to decrease or increase, respectively, the volume of the chamber 29. Decrease of the volume in the chamber 29 will increase the pressure of the permanent gas in chamber 20 and decrease the temperature at which the thermostat responds to the surrounding medium, while increase in the volume of the chamber 29 will have the opposite effect. This will be apparent from the following considerations:—Assume it to be desired to lower the temperature at which the thermostat responds to the surrounding medium; a decrease in the volume of the chamber 29 will cause liquid to flow therefrom through tube 28 into the chamber 20 and decrease the volume occupied by the vapor and gas. In so far as the vapor is concerned, this will not vary the pressure in said space, assuming the temperature to be constant, because the pressure of a vapor in the presence of its liquid is proportionate to the temperature and independent of the volume. But inasmuch as a permanent gas follows Boyle's law, a decrease in the volume of the space occupied by the vapor and gas will result in a corresponding increase in the pressure of the gas. Therefore, if a certain pressure P is required to overcome the resistance to movement of the valve member and its actuating mechanism, in order to open said valve, the increase in the gas pressure decreases the differential between said pressure P and the gas pressure, whereby a lower vapor pressure will when added to said gas pressure overbalance the pressure P and result in the opening of the valve member. As this lower vapor pressure will be reached at a lower temperature of the surrounding medium, the regulator will therefore be opened at a lower temperature of said medium.

It will also be perceived that by appropriately selecting the pressure of the charge the differential between the interior and exterior pressures may be such that upon failure of the thermostat, as by leakage, the valve member will be moved by the inherent resiliency of the deeply corrugated lateral wall of chamber 20 to an open or safe position, as well understood in the art.

The embodiment of Fig. 3 illustrates that the adjustment mechanism may be disposed relatively remote from the regulator, as on the dash for example. As here shown the housing 10 and the elements contained therein may be and as shown are of substantially the same construction as in the embodiment of Figs. 1 and 2. In this embodiment, however, the tube 28 is extended to and suitably secured in an aperture in the wall of a relatively remote chamber 50, which may be disposed at any suitable distance away from the housing 10. Suitably formed on or attached to the wall of the chamber 50 is a flange 51 apertured at its center and having suitably secured thereto the end of a deeply corrugated tubular metallic wall or bellows 52, here shown as having a movable end wall 53 integral therewith. Attached in any suitable way to said end wall 53 is a stem 54 which, at its outer end, is suitably attached, as by screw 55, to a cover member 56 which has threaded engagement with the wall of the chamber 50. By rotating the member 56 on the wall of the chamber 50 the stem 54 is caused to expand or contract the chamber between wall 50 and bellows 52, decreasing or increasing, respectively, the volume of the chamber 50. Member 56 may be provided with any suitable indicia and cooperate with any suitable pointer so that the relationship thereof with respect to the temperature at which the regulator responds to the surrounding medium may be readily determined. Otherwise the embodiment of Fig. 3 operates in the same manner as that heretofore described in conjunction with the embodiment of Figs. 1 and 2.

It will therefore be perceived that by the present invention a temperature regulator has been provided employing novel means for adjusting the temperature at which the regulator responds to the temperature of the controlling medium. By the use of a permanent gas in the vapor space of a vapor thermostat a decrease in the volume of the vapor space, owing to the increase in gas pressure incident thereto, will result in a decrease in the temperature at which the regulator responds to the temperature of the controlling medium, and therefore the responding temperature of a vapor thermostat may be adjusted by changing the volume of a chamber in or communicating with the thermostatic element. Therefore, the use of a spring as heretofore required for the adjustment of a vapor thermostat has been eliminated and, as the chamber of variable volume may be disposed at any suitable location and at any desired distance from the regulator, as well as in the thermostat itself, the present invention provides for ready adjustment of the thermostat from the exterior thereof and at any desired distance therefrom without any need for dismantling the regulator or the system with which it is associated.

At the same time the device is relatively simple in construction, easy to manufacture and assemble, and therefore inexpensive to produce, easy to install, and both highly efficient in operation and capable of ready adjustment.

While the embodiments of the invention illustrated on the drawing have been described with considerable particularity, it is to be understood that the invention is not restricted thereto, but are to be taken as illustrative of the principle involved rather than as definitive of the structure or use to be employed. While the invention has been shown as incorporated in a temperature regulator for cooling systems the invention is not to be limited thereto, as the invention may be embodied in a wide variety of constructions, and employed in a wide variety of uses, as will now be readily apparent to those skilled in the art, while many changes may be made in the details of construction, arrangement, proportion, material, etc., of the respective parts, in the form, character and size of the expansible and collapsible chambers, thermostat, etc., while any suitable means for varying the volume of the expansible and collapsible chamber in or communicating with the thermostat may be used, any suitable means for indicating or correlating its condition of adjustment with the temperature to be maintained may be provided, and various other changes which will now readily suggest themselves to those skilled in the art may be made when embodying the present invention. Reference is therefore to be had to the appended claims for a definition of said invention.

What is claimed is:—

1. In a temperature regulator, in combination with a member to be controlled, an expansible and collapsible chamber operatively connected to said member and charged with a volatile fluid and a predetermined quantity of permanent gas, and means for varying the volume of volatile fluid in said chamber to vary the pressure of said gas therein.

2. In a temperature regulator, in combination with a member to be controlled, an expansible and collapsible chamber operatively connected to said member and charged with a volatile fluid and a predetermined quantity of permanent gas, an expansible and collapsible chamber in communication with said first named chamber and containing said volatile fluid, and means to expand and collapse said last named chamber to vary the volume of said volatile fluid in said first named chamber and thereby vary the pressure of said gas therein.

3. In a temperature regulator, in combination with a member to be controlled, an expansible and collapsible chamber operatively connected to said member and charged with a volatile fluid and a predetermined quantity of permanent gas, and means for varying the pressure in said chamber independently of the temperature thereof by varying the volume of volatile liquid in said chamber to vary the pressure of the gas therein.

4. In a temperature regulator, in combination with a member to be controlled, an expansible and collapsible chamber operatively connected to said member and charged with a volatile fluid and a predetermined quantity of permanent gas, an expansible and collapsible chamber communicating with said first named chamber and charged with a liquid, and means for varying the pressure in said first named chamber independently of the temperature thereof by varying the volume of said last named chamber to introduce liquid into or withdraw liquid from said first named chamber and thereby vary the gas pressure in said first named chamber.

5. In a temperature regulator, in combination with a member to be controlled, an expansible and collapsible chamber operatively connected to said member and charged with a volatile fluid and a predetermined quantity of permanent gas, and means to vary the pressure of the volatile liquid in said chamber independently of the temperature thereof to vary the pressure of said gas in said chamber.

6. In a temperature regulator, in combination with a member to be controlled, an expansible and collapsible chamber operatively connected to said member and charged with a volatile fluid and a predetermined quantity of permanent gas, and means for increasing or decreasing the pressure of the volatile liquid in said chamber on the gas in said chamber independently of the temperature thereof to decrease or increase respectively the temperature at which said regulator responds to the temperature of the controlling medium.

7. In a temperature regulator, in combination with a member to be controlled, an expansible and collapsible chamber operatively connected to said member and charged with a volatile fluid and a predetermined quantity of permanent gas, and means acting through the volatile liquid in said chamber for increasing or decreasing the volume of the vapor space in said chamber independently of the temperature thereof to vary the gas pressure therein and thereby increase or decrease respectively the temperature at which said regulator responds to the temperature of the controlling medium.

8. In a temperature regulator, in combination with a member to be controlled, an expansible and collapsible chamber operatively connected to said member and charged with a volatile fluid and a predetermined quantity of permanent gas, an expansible and collapsible chamber separate from said first named chamber and communicating therewith through an interposed tube, and means associated with said last named chamber to vary the volume of liquid in said first named chamber to increase or decrease the gas pressure therein independently of the temperature thereof and thereby decrease or increase respectively the temperature at which said regulator responds to the temperature of the controlling medium.

9. In a temperature regulator, in combination with a housing, a valve seat therein, and a valve member cooperating with said seat, an expansible and collapsible chamber mounted in said housing and having its movable end wall operatively connected to said valve member, said expansible and collapsible chamber being charged with a volatile fluid and a predetermined quantity of permanent gas, and means accessible from the exterior of said housing for adjusting the volume of the vapor space and the pressure of said gas in said chamber.

10. In a temperature regulator, in combination with a housing, a valve seat therein, and a valve member cooperating with said seat, an expansible and collapsible chamber mounted in said housing and having its movable end wall operatively connected to said valve member, said expansible and collapsible chamber being charged with a volatile fluid and a predetermined quantity of permanent gas, and means accessible exteriorly of said housing for injecting liquid into or withdrawing liquid from said chamber independently of the temperature thereof to vary the volume of the vapor space and the pressure of the gas therein.

11. In a temperature regulator, in combination with a housing, a valve seat therein, and a valve member cooperating with said seat, an expansible and collapsible chamber mounted in said housing and having its movable end wall operatively connected to said valve member, said expansible and collapsible chamber being charged with a volatile fluid and a predetermined quantity of permanent gas, an expansible and collapsible chamber accessible exteriorly of said housing and communicating with said first named chamber, and means to vary the volume of said last named chamber to vary the volume of the vapor space in said first named chamber independently of the temperature thereof and thereby vary the pressure of the gas therein.

12. In a temperature regulator, in combination with a housing, a valve seat therein, and a valve member cooperating with said seat, an expansible and collapsible chamber mounted in said housing and having its movable end wall operatively connected to said valve member, said expansible and collapsible chamber being charged with a volatile fluid and a predetermined quantity of permanent gas, an expansible and collapsible chamber accessible exteriorly of said housing and communicating with said first named chamber, and means to vary the volume of said last named chamber comprising rotatable means operatively connected to a movable wall of said last named chamber and operative to force liquid into or withdraw liquid from said first named chamber independently of the temperature thereof and thereby vary the pressure of the gas therein.

13. In a temperature regulator, in combination with a housing adapted to be mounted in the cooling system of an internal combustion engine, a member providing a valve seat in said housing, a valve member cooperating with said seat, an expansible and collapsible chamber having its movable end wall operatively connected with said valve member, means mounted on said seat member for supporting said expansible and collapsible chamber, said chamber being charged with a volatile fluid and a permanent gas, a tube communicating with said chamber at one end, an expansible and collapsible chamber mounted in the wall of said housing and communicating with said tube at its opposite end, and a rotatable member operatively connected to the movable end wall of said last named chamber and adapted by its rotation to vary the volume thereof and thereby vary the volume of volatile fluid in said first named chamber to vary the gas pressure therein.

14. In a temperature regulator, in combination with a housing adapted to be mounted in the cooling system of an internal combustion engine, a member providing a valve seat in said housing, a valve member cooperating with said seat, an expansible and collapsible chamber having its movable end wall operatively connected with said valve member, means mounted on said seat member for supporting said expansible and collapsible chamber, said chamber being charged with a volatile fluid and a permanent gas, a tube communicating with said chamber at one end, an expansible and collapsible chamber mounted relatively remote from said casing and communicating with the opposite end of said tube, and means cooperating with the movable end wall of said last named chamber to vary the volume thereof and thereby vary the volume of volatile fluid in said first named chamber to vary the gas pressure therein.

JOHN E. DUBE.